US006810651B1

(12) United States Patent
Washington

(10) Patent No.: US 6,810,651 B1
(45) Date of Patent: Nov. 2, 2004

(54) YARD WASTE COLLECTION BAG

(76) Inventor: Sandra M. Washington, 9116 S. Richmond Ave., Evergreen Park, IL (US) 60805

(*) Notice: Subject to any disclaimer, the term of this patent is extended or adjusted under 35 U.S.C. 154(b) by 6 days.

(21) Appl. No.: 10/302,561

(22) Filed: Nov. 22, 2002

(51) Int. Cl.[7] .......................... A01D 43/00; A01D 43/06
(52) U.S. Cl. ....................................................... 56/202
(58) Field of Search ................................ 56/202, 320.2; 383/11, 71, 72, 62; 220/495.06, 495.08, 495.09, 495.11

(56) References Cited

U.S. PATENT DOCUMENTS

| 3,055,568 | A | * | 9/1962 | Zalkind ................ 229/117.27 |
| 3,213,600 | A | * | 10/1965 | Anderson ...................... 56/202 |
| 3,611,685 | A | * | 10/1971 | Allina ........................... 56/202 |
| D229,083 | S | | 11/1973 | Leader |
| 3,867,324 | A | * | 2/1975 | Clendinning et al. ........ 523/126 |
| 3,995,414 | A | * | 12/1976 | Kerr et al. ...................... 56/202 |
| 4,008,851 | A | * | 2/1977 | Hirsch ........................... 383/62 |
| 4,036,220 | A | * | 7/1977 | Bellasalma ..................... 602/3 |
| 4,477,075 | A | * | 10/1984 | Outman ....................... 473/458 |
| 4,747,259 | A | | 5/1988 | Kline et al. |
| 4,989,400 | A | | 2/1991 | Wark |
| 5,003,758 | A | * | 4/1991 | Bernstein ....................... 56/202 |
| 5,044,775 | A | * | 9/1991 | Rutledge ....................... 383/72 |
| 5,045,042 | A | * | 9/1991 | Rutledge ..................... 493/225 |
| 5,179,824 | A | | 1/1993 | Ridge et al. |
| 5,392,492 | A | | 2/1995 | Fassauer |
| 5,425,468 | A | * | 6/1995 | Birkel et al. ........... 220/495.11 |
| 5,673,544 | A | | 10/1997 | Voigt |
| 5,913,606 | A | * | 6/1999 | Nicholson ..................... 383/11 |
| D430,284 | S | * | 8/2000 | Hernandez ................. D23/499 |
| 6,151,875 | A | * | 11/2000 | Collins ......................... 56/202 |

* cited by examiner

Primary Examiner—Árpád Fab Kovács
(74) Attorney, Agent, or Firm—Leonard & Proehl, Prof. LLC; Jeffrey Proehl; Troy Leonard

(57) ABSTRACT

A yard waste collection bag for providing a user with a biodegradable bag that would be attached to a yard machine discharge chute. The yard waste collection bag includes a main bag member having a perimeter wall that extends between a first and second end. The first end is open. The first end is designed for engaging an output of yard maintenance equipment. The second end is closed such that the second and the perimeter wall form a bag for collecting yard waste discharged from the yard maintenance equipment. At least one elongate member is coupled to the second end of the main bag member. The elongate member is for facilitating holding and transporting the main bag member.

1 Claim, 3 Drawing Sheets

YARD WASTE COLLECTION BAG

BACKGROUND OF THE INVENTION

1. Field of the Invention

The present invention relates to lawn mower bags and more particularly pertains to a new yard waste collection bag for providing a user with a biodegradable bag that would be attached to a yard machine discharge chute.

2. Description of the Prior Art

The use of lawn mower bags is known in the prior art. U.S. Pat. No. 5,673,544 describes a disposable lawn mower debris bag system. Another type of lawn mower bag is U.S. Pat. No. 5,179,824 describing a disposable grass catcher for lawn mowers. U.S. Pat. No. 4,989,400 describes a disposable bag and mounting apparatus for a lawn mower that collects grass clippings and the like. U.S. Pat. No. 5,392,492 describes an air-floated apparatus that functions similarly to a vacuum cleaner. U.S. Pat. No. 4,747,259 describes a grass catching assembly and disposable bag. U.S. Pat. No. Des. 229,083 describes an ornamental design for a disposable grass catcher bag.

SUMMARY OF THE INVENTION

The object of the present invention is to provide a new yard waste collection bag that would be easy to use and offer the user timesaving qualities, efficiency, and reduced physical strain.

Another object of the present invention is to provide a new yard waste collection bag that would be environmentally friendly and would eliminate the need to empty a conventional bag into another plastic bag or receptacle for disposal.

To this end, the present invention generally comprises a main bag member having a perimeter wall that extends between a first and second end. The first end is open. The first end is designed for engaging an output of yard maintenance equipment. The second end is closed such that the second and the perimeter wall form a bag for collecting yard waste discharged from the yard maintenance equipment. At least one elongate member is coupled to the second end of the main bag member. The elongate member is for facilitating holding and transporting the main bag member.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
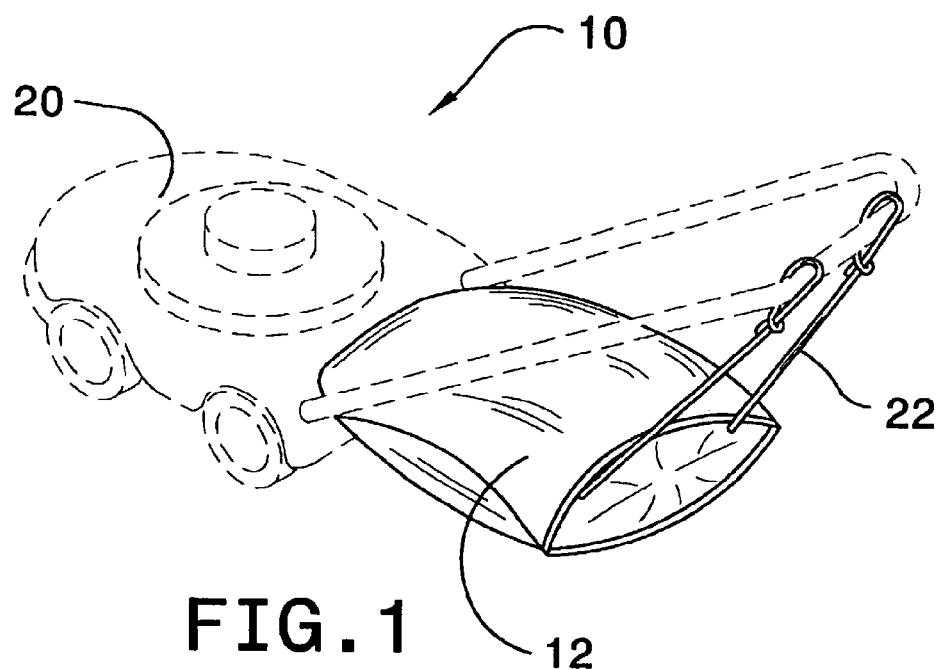
FIG. 1 is a perspective view of a new yard waste collection bag according to the present invention.
Figure 2:
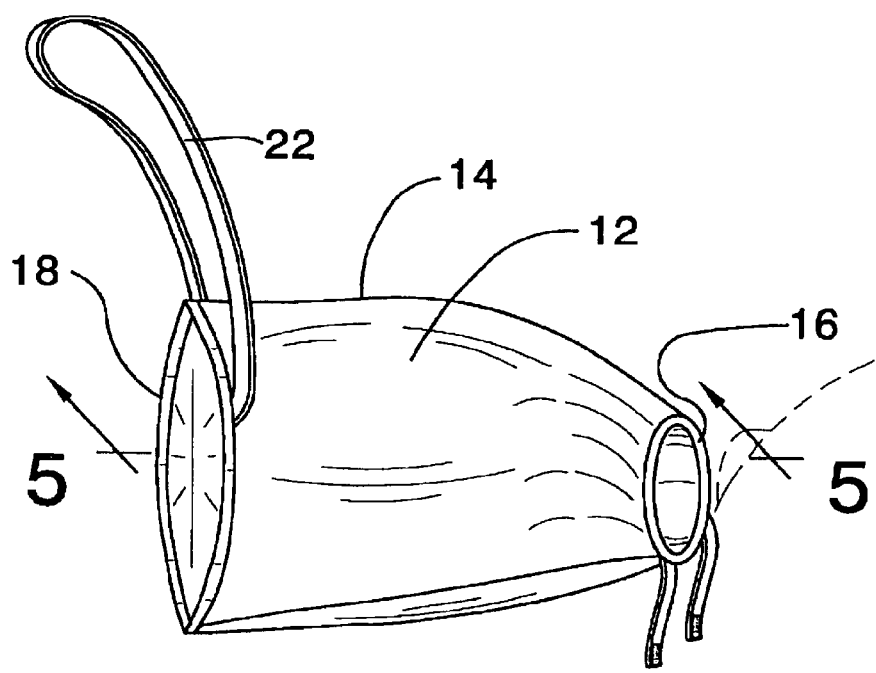
FIG. 2 is a perspective view of the present invention.
Figure 3:
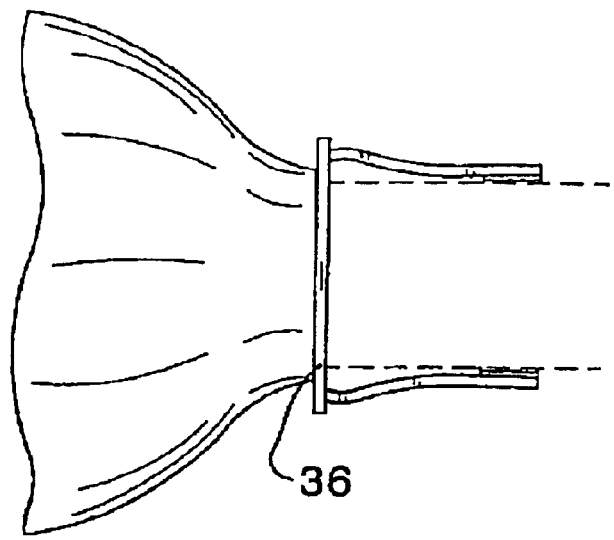
FIG. 3 is a side view of the present invention.
Figure 4:
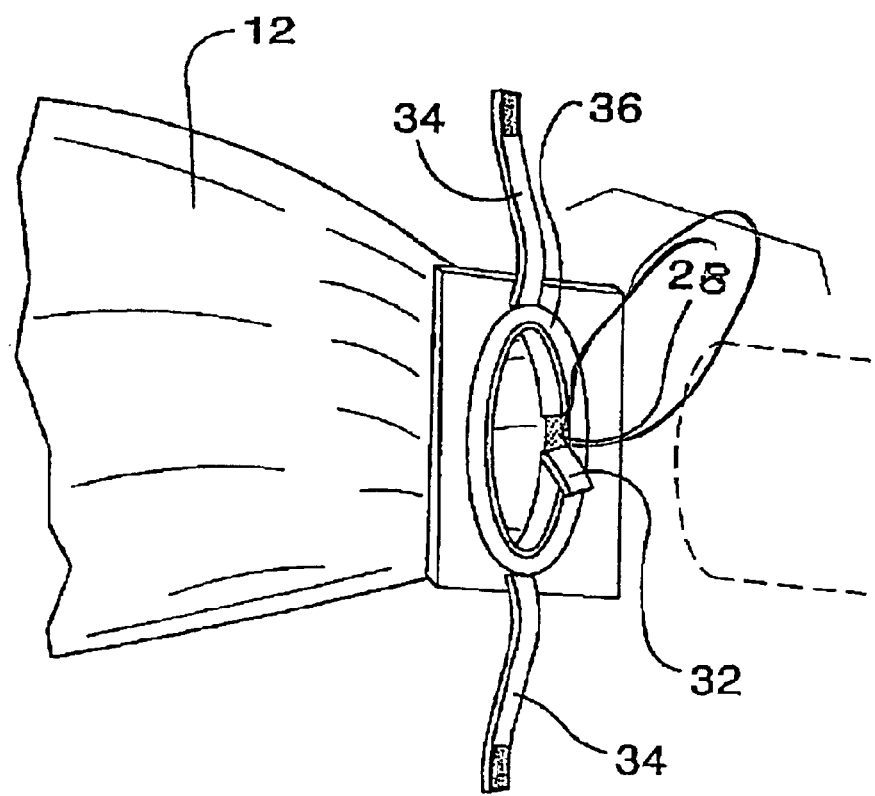
FIG. 4 is a perspective view of the present invention.
Figure 5:
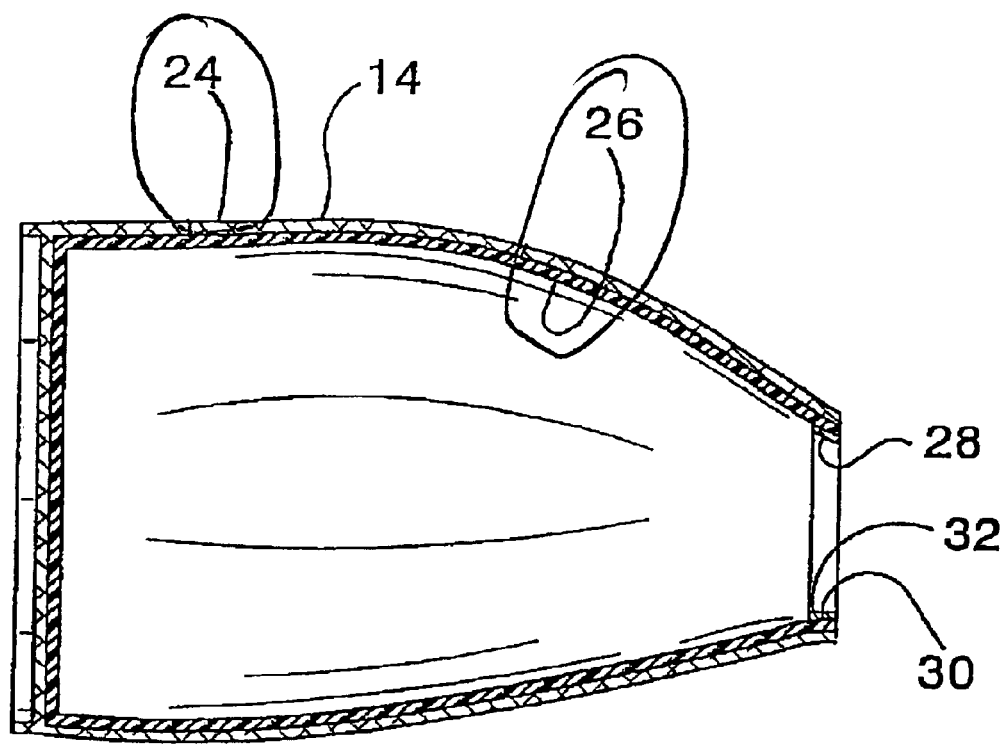
FIG. 5 is a cross-sectional view of the present invention.

With reference now to the drawings, and in particular to FIGS. 1 through 5 thereof, a new yard waste collection bag embodying the principles and concepts of the present invention and generally designated by the reference numeral 10 will be described.

As best illustrated in FIGS. 1 through 5, the yard waste collection bag 10 generally comprises a main bag member 12 having a perimeter wall 14 that extends between a first 16 and second end 18. The first end 16 is open. The first end 16 is designed for engaging an output of yard maintenance equipment 20. The second end 18 is closed such that the second and the perimeter wall 14 form a bag for collecting yard waste discharged from the yard maintenance equipment 20. At least one elongate member 22 is coupled to the second end 18 of the main bag member 12. The elongate member 22 is for facilitating holding and transporting the main bag member 12.

The main bag member 12 further includes a paper layer 24 that is substantially biodegradable. The paper layer 24 is designed for holding yard waste discharged by the yard maintenance equipment 20. The main bag member 12 further includes a polymeric liner member 26 that is coupled to the paper layer 24. The polymeric layer 26 inhibits tearing of the main bag member 12. The polymeric liner member 26 inhibits migration of moisture through the perimeter wall 14 of the main bag member 12.

The perimeter wall 14 is pleated such that the main bag member 12 is expandable along a diameter of the main bag member 12 as the main bag member 12 receives yard waste discharged from the yard maintenance equipment 20.

An adhesive layer 28 is applied along an interior edge 30 of the first end 16 of the main bag member 12. The adhesive layer 28 facilitates the selective coupling of the main bag member 12 to an output surface of the yard maintenance equipment 12. A cover strip 32 is applied to a surface of the adhesive layer 28. The cover strip 32 is removable from the adhesive layer 28. The cover strip 32 protects the adhesive layer 28 until use.

A pair of securing straps 34 is coupled to the main bag member 12 adjacent to the first end 16 of the main bag member 12. The pair of securing straps 34 is for selectively coupling the first end 16 of the main bag member 12 to the yard maintenance equipment 20.

A reinforcing sleeve member 36 is coupled to the first end 16 of the main bag member 12. The reinforcing sleeve 36 is for inhibiting tearing of the first end 16 of the main bag member 12 during use. The reinforcing sleeve member 36 includes a sleeve material selected from the group of sleeve materials consisting of paper, cardboard, and cellulose.

In use, a user would position the opening of the bag around the debris chute of a yard machine. The user would then secure the bag utilizing the securing straps to secure the opening of the bag to the debris chute.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A yard waste collection bag couplable to a yard maintenance equipment, comprising:

a main bag member having a perimeter wall extending between a first and second end, said first end being open, said first end being adapted for engaging an output of yard maintenance equipment, said second end being closed such that said second and said perimeter wall forming a bag for collecting yard waste discharged from the yard maintenance equipment; and at least one elongate member coupled to said second end of said main bag member, said elongate member being for facilitating holding and transporting said main bag member;

wherein said main bag member further comprises a paper layer being substantially biodegradable, said paper layer being adapted for holding yard waste discharged by the yard maintenance equipment;

wherein said main bag member further comprises a polymeric liner member coupled to said paper layer, said polymeric layer inhibiting tearing of said main bag member, said polymeric liner member inhibiting migration of moisture through said perimeter wall of said main bag member;

wherein said perimeter wall being pleated such that said main bag member being expandable along a diameter of said main bag member as main bag member receives yard waste discharged from said yard maintenance equipment;

wherein an adhesive layer applied along an interior edge of said first end of said main bag member, said adhesive layer facilitating selective coupling of said main bag member to an output surface of the yard maintenance equipment; and a cover strip applied to a surface of said adhesive layer, said cover strip being removable from said adhesive layer, said cover strip protecting said adhesive layer until use;

wherein a pair of securing straps coupled to said main bag member adjacent to said first end of said main bag member, said pair of securing straps being for selectively coupling said first end of said main bag member to the yard maintenance equipment;

wherein a reinforcing sleeve member coupled to said first end of said main bag member, said reinforcing sleeve being for inhibiting tearing of said first end of said main bag member during use; and wherein said reinforcing sleeve member comprises a sleeve material selected from the group of sleeve materials consisting of paper, cardboard, and cellulose.

* * * * *